(12) United States Patent
Keukens (10) Patent No.: US 10,044,391 B2
(45) Date of Patent: Aug. 7, 2018

(54) RADIO RECEIVER MODULE

(71) Applicant: NXP B.V.

(72) Inventor: Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/848,145

(22) Filed: Dec. 20, 2017

(65) Prior Publication Data

US 2018/0183476 A1 Jun. 28, 2018

(30) Foreign Application Priority Data

Dec. 22, 2016 (EP) .................................. 16206467

(51) Int. Cl.
*H04B 1/16* (2006.01)
*H04B 1/10* (2006.01)
*H04B 1/08* (2006.01)
*H04B 1/12* (2006.01)

(52) U.S. Cl.
CPC ........... *H04B 1/1661* (2013.01); *H04B 1/082* (2013.01); *H04B 1/109* (2013.01); *H04B 1/1036* (2013.01); *H04B 1/123* (2013.01)

(58) Field of Classification Search
CPC .... H04B 1/1661; H04B 1/082; H04B 1/1036; H04B 1/109; H04B 1/123
See application file for complete search history.

(56) References Cited

U.S. PATENT DOCUMENTS

| | | | |
|---|---|---|---|
| 6,246,827 B1 * | 6/2001 | Strolle | H04N 5/923 348/392.1 |
| 6,272,226 B1 | 8/2001 | Khan et al. | |
| 6,665,355 B1 | 12/2003 | Chen et al. | |
| 2010/0220821 A1 | 9/2010 | Vrcelj et al. | |
| 2011/0059716 A1 * | 3/2011 | Cork | G01R 33/3692 455/330 |
| 2011/0234447 A1 * | 9/2011 | Patrick | G01S 3/14 342/44 |
| 2013/0029585 A1 * | 1/2013 | Kroeger | H04L 27/156 455/3.01 |
| 2016/0164569 A1 * | 6/2016 | Morton | H04B 1/68 375/296 |

FOREIGN PATENT DOCUMENTS

WO 2013/072865 A1 5/2013

* cited by examiner

*Primary Examiner* — Junpeng Chen
(74) *Attorney, Agent, or Firm* — Rajeev Madnawat (57) ABSTRACT

The disclosure relates to a radio receiver module for receiving a signal having a lower side band and an upper side band, the module comprising: a noise detector configured to identify a noise frequency associated with an unwanted noise signal within the lower or upper side band; a filter configured to attenuate the noise frequency and increase gain at a mirror frequency within the signal in order to provide a filtered signal, wherein the mirror frequency is within the sideband that is unaffected by the unwanted noise signal and the mirror frequency corresponds to the noise frequency.

15 Claims, 3 Drawing Sheets

RADIO RECEIVER MODULE

CROSS-REFERENCE TO RELATED APPLICATIONS

This application claims the priority under 35 U.S.C. § 119 of European Patent application no. 16206467.9, filed on Dec. 22, 2016, the contents of which are incorporated by reference herein.

The present disclosure relates to a radio receiver module for receiving a signal having a lower side band and an upper side band, and in particular, although not exclusively, to a radio receiver module for correction vehicle-generated electronic noise in an amplitude modulated signal.

The automotive industry is developing such that the quantity of electronic devices that are included within each vehicle has increased dramatically in recent years, a trend which shows no sign of abatement in future generations of vehicle models. A varied array of electronic devices are included in modern vehicles that were not present in earlier generations of models. Such devices include control systems, such as engine management and traction control systems, additional safety equipment, such as airbags and automatic braking systems, and comfort devices, such as heated seats and audio equipment. Each electronic device within a vehicle can cause distortion to the reception of amplitude modulated (AM) radio signals by on-board audio equipment, which are typically configured to operate between 600 kHz and 1600 kHz in order to receive broadcast transmissions. Many of the sources cause distortion on only a limited part of the spectrum. Within a particular AM channel distortion, may be present at a single frequency, which is experienced as a whistle in the audio on the channel, or as multiple tones spread over the spectrum. In some examples, a small band of noise may be introduced into an AM channel. A discrete frequency at which distortions will occur is not a priori known and may change over time in terms of bandwidth, amplitude and frequency. Such changes in noise profile may be due to a changing temperature or mode of vehicle systems during operation.

For example, a power converter is an in-vehicle system that generates noise that can affect the AM spectrum. A power convertor has an oscillator that operates at a fundamental frequency. The fundamental frequency and its harmonics can fall within the AM frequency band. The strength of the whistle induced by the power convertor depends on the consumed power, which changes over time depending on the demands placed upon the power convertor by other systems of the vehicle. The frequency of the whistle will also change as the power converter heats or cools because this changes the frequency of the oscillator. Dependent on the stability of the oscillator, either a discrete tone or a noise band may be induced in the AM spectrum. Preventing the convertor from generating these signals is impracticable. However, the provision of electromagnetic shielding can reduce the radiation that is emitted from the power converter. Car radio receivers are typically very sensitive, which means that even this reduced radiation may disturb AM reception. In addition, the provision of hardware, such as shielding, to reduce radiation emission is expensive and adds weight to the vehicle. It is therefore desirable to reduce or eliminate the effect of electromagnetic disturbance on AM signals while avoiding the disadvantages of providing electromagnetic shielding.

According to a first aspect of the present disclosure there is provided a radio receiver module for receiving a signal having a lower side band and an upper side band, the module comprising:

a noise detector configured to identify a noise frequency associated with an unwanted noise signal within either the lower or upper side band; and a filter configured to attenuate the noise frequency and increase the gain at a mirror frequency within the signal in order to provide a filtered signal, wherein the mirror frequency is within the sideband that is unaffected by the unwanted noise signal and the mirror frequency corresponds to the noise frequency.

The mirror frequency may have a frequency range that is less than a bandwidth of the sideband in which it is situated. The noise frequency may have a frequency range that is less than a bandwidth of the sideband in which it is situated. The increase in gain at the mirror frequency may be a relative increase with respect to a frequency within the sideband that is unaffected by the unwanted noise signal other than the mirror frequency. The mirror frequency may correspond to the noise frequency in that the mirror frequency has a bandwidth that is separated from a carrier frequency of the signal by a corresponding frequency that the noise signal is separated from the carrier frequency.

The filter may be an adaptive filter having filter coefficients. The adaptive filter may have real and imaginary filter coefficients. The adaptive filter may be configured to update imaginary adaptive filter coefficients based on the error signal. The adaptive filter may be configured to update only imaginary adaptive filter coefficients based on the error signal. The real coefficient of the adaptive filter may be set to zero and so result in no real signal filtering. The error signal may be based on an imaginary signal component of the filtered signal. The error signal may be based on only an imaginary signal component of the filtered signal. The noise detector may be configured to receive the filtered signal from the adaptive filter. The noise detector may be configured to provide an error signal based on the filtered signal. The adaptive filter may be configured to recalculate the filter coefficients based on to the error signal.

The radio receiver module may comprise an update controller. The update controller may be configured to control updating of the filter coefficients in response to one or more of: an amplitude of real frequency components of the signal; an amplitude of real frequency components of the filtered signal; an amplitude of imaginary frequency components of the filtered signal; the change in the noise signal; and the presence of an audio signal in the upper or lower side bands in comparison with an audio threshold. The update controller may control an update factor by which the filter coefficients may change per unit time. The update controller may control an update frequency. The update controller may be configured to determine a change in the noise frequency associated with the unwanted noise signal. The update controller may be configured to instruct the adaptive filter to update the filter coefficients in response to the determination of the change in the noise signal. The update controller may comprise a band pass filter. The band pass filter may be configured to pass a signal at the one or more filter coefficients of the adaptive filter. The band pass filter may be arranged to receive an output of the adaptive filter. The band pass filter may be configured to provide a band-passed signal. The update controller may be configured to update the adaptive filter in accordance with a comparison between the output of the adaptive filter and the band-passed signal. The band pass filter may be configured to pass a signal at the one or more imaginary domain filter coefficients of the adaptive filter. The update controller may be configured to update the adaptive filter in accordance with the imaginary part of the output of the adaptive filter and the band passed signal.

According to a further aspect of the disclosure there is provided a vehicle comprising a radio receiver having the radio receiver module.

According to a further aspect of the disclosure there is provided a method of receiving a signal having a lower side band and an upper side band, the method comprising:
  identifying a noise frequency associated with an unwanted noise signal within either the lower or upper side band;
  attenuating the noise frequency; and
  increase a mirror frequency within the signal, wherein the mirror frequency is within the sideband that is unaffected by the unwanted noise signal and the mirror frequency corresponds to the noise frequency.

According to a further aspect of the disclosure there is provided a computer program configured to implement the method.

Also disclosed is a channel equalizer comprising:
  an adaptive filter having one or more filter coefficients;
  a filter lock detector comprising a band pass filter configured to pass a signal at the one or more filter coefficients of the adaptive filter, wherein the bandpass filter is arranged to receive an output of the adaptive filter and provide a band passed signal;
  an update controller configured to control updating of the adaptive filter in response to a comparison between the output of the adaptive filter and the band passed signal.

Also disclosed is a channel equalizer comprising:
  an adaptive filter having one or more filter coefficients;
  a selected signal threshold detector comprising a band pass filter configured to pass the selected signal, wherein the bandpass filter is arranged to receive an output of the adaptive filter and provide a band passed signal;
  an update controller configured to control updating of the adaptive filter in response to a comparison between the output of the adaptive filter and the band passed signal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

One of more embodiments will now be described by way of example only with reference to the accompanying drawings in which.

Figure 1:
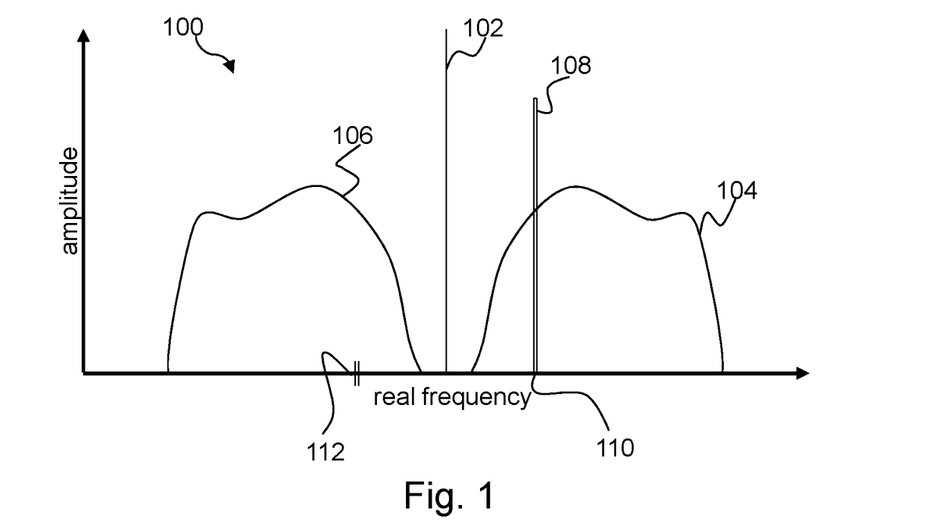
FIG. 1 shows an amplitude against frequency profile for an amplitude modulated, AM, signal and an interfering noise signal.

The transmission standard for AM broadcast radio is to provide a carrier frequency and double side bands. FIG. 1 illustrates an amplitude against real frequency profile for an amplitude modulated signal 100 comprising a carrier frequency 102 and signal content in an upper sideband 104 and a lower sideband 106. The upper sideband is at higher frequencies with respect to the carrier frequency 102 and the lower sideband 106 is provided at lower frequencies with respect to the carrier frequency 102. In the case where the amplitude modulated signal 100 has been down converted, the carrier frequency 102 is provided at 0 Hz, the upper sideband 104 is provided at positive frequencies and the lower sideband 106 is provided at negative frequencies. The upper side band 104 is a mirror of the lower side band 106 and each side band 104, 106 contains the same audio content. The double side band AM signal therefore has some redundancy in the transmission of information.

In this example, a whistle tone representative of a noise signal 108, which may provide a by electronic components that are in the vicinity of the radio receiver, is located at a noise frequency 110 and occupies a noise frequency band. The unwanted noise signal 108 typically occupies a frequency range that is less than a bandwidth of the sideband 104 in which it is situated. The upper side band 104 can be considered to have been affected by noise in this example. A mirror frequency band is located at a mirror frequency 112 in the lower sideband 106 which is unaffected by noise in this example. The mirror frequency 112 has a frequency range that is less than a bandwidth of the sideband 104 in which it is situated. That is, the noise frequency 110 and mirror frequency 112 occupy only a subsection of their respective sideband 104, 106, rather than all of the sideband 104, 106. The mirror frequency 112 corresponds to the noise frequency 110 in that the mirror frequency 112 is the same distance away from the carrier frequency 102, in terms of frequency, than the noise frequency 110 is away from the carrier frequency 102.

One example method for mitigation of whistle noise is to use the property of redundant information in the AM signal and select only the unaffected side band and discard the effected side band. This method is only suitable if distortion is only present in one of the side bands, and not both side bands. Another disadvantage of this method is that discarding one of the side bands results in a loss off 3 dB in the signal-to-noise ratio of a system that implements the method.

Another compensation method involves regenerating the original noise signal and subtracting this regenerated noise signal from the received signal. This method does not support a noise band and is very sensitive to the accuracy of detecting the phase and amplitude of the noise with a changing amplitude, where either predicting the future is required or the reception performance is degraded.

Yet another method for compensating for such noise involves frequency detection followed by placing steep filter notches at the frequency of the distortion. This, however, also removes part of the wanted spectrum if performed in the audio (real frequency) domain. In some examples, a filter notch may be placed at only one side of the spectrum in the complex domain. However, a 6 dB frequency dependent signal loss is presented at the notch.

Aspects of the present disclosure relate to compensating for a noise signal by filtering noise from an affected side band and boosting a corresponding portion of an unaffected sideband. In this way, the algorithm may automatically compensate for the amplitude loss by doubling the gain at the opposite, unaffected side band. Using such a scheme, it is also possible to cancel noise signals in both side bands, for example, where a whistle at −1 kHz and a whistle at +2 kHz are present at the same time. In addition, a flat audio frequency response may be maintained for the transmitted audio signal. Such a method is discussed further below with reference to FIGS. 2 to 6.

Figure 2:
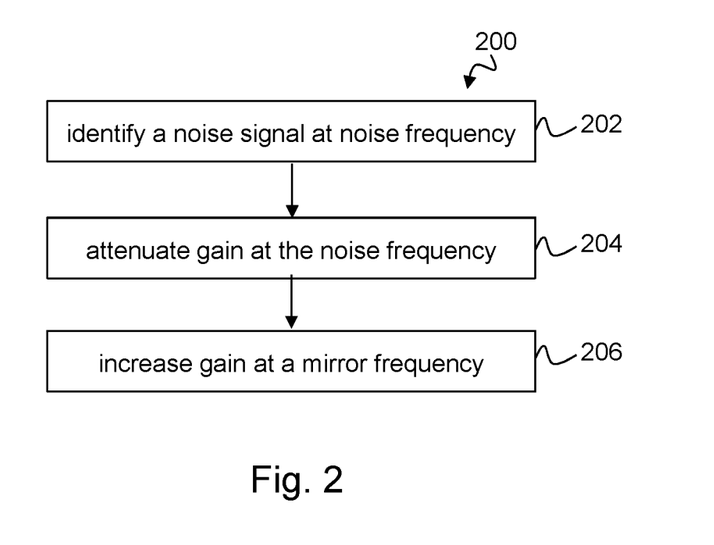
FIG. 2 shows a block diagram of a method for compensating for a noise signal in an AM signal.

FIG. 2 illustrates a method 200 of receiving a signal having a lower side band and an upper side band. The method 200 comprises identifying 202 an unwanted noise signal associated with a noise frequency within either the lower or upper side band. The unwanted noise signal at the noise frequency is attenuated 204 and again at a mirror frequency within the signal is increased 206. The mirror frequency is within the sideband that is unaffected by the unwanted noise signal and the mirror frequency corresponds to the noise frequency. The attenuation 204 of the noise frequency and the increase 206 of the mirror frequency may be performed simultaneously, or sequentially in any order.

Figure 3:
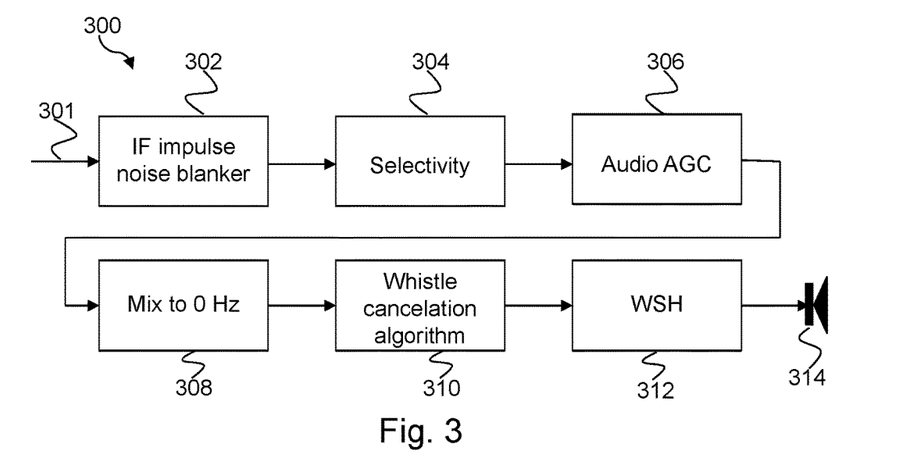
FIG. 3 shows a schematic block diagram of a radio receiver comprising a radio receiver module for compensating for a noise signal.

FIG. 3 illustrates a schematic block diagram of a radio receiver 300 for receiving an amplitude modulated signal having an upper side and a lower sideband. The radio receiver 300 may be implemented by physical components in a circuit, or it may be implemented partially or completely by software, as is the case with software radio. The radio receiver receives, or generates, an intermediate frequency (IF) signal 301. The intermediate frequency signal 301 is provided to an impulse noise blanker 302. The impulse noise blanker 302 blanks short pulses that are spread spectrum. Such blanked signals may be repaired by estimating the short blanked pulses (using interpolation, for example). A selectivity module 304 is provided in order to select a desired channel and reject other channels, which may include neighbouring channels to the selected channel. In this way, the radio receiver 300 is able to provide audio content, for example, at a radio station required by the user. Automatic gain control 306 is applied to the selected channel. Automatic gain control 306 may be performed by adjusting an amplitude of the upper and lower sidebands of a signal in relation to an amplitude of the carrier frequency of the signal to provide a gain adjusted signal. The gain adjusted signal is down converted, or mixed to 0 Hz, by a mixer 308. Subsequently, further audio processing 312, such as a weak signal handling algorithm, may be applied to the signal by an audio processor in order to provide an enhanced audio signal with improved apparent audio properties. Weak signal handling may include suppressing high-frequencies, for example. The audio signal provided by the audio processing 312 is then suitable for providing to a speaker 314, or other output device. The above-described modules of the receiver 300 may be implemented by conventional means.

The receiver 300 differs from a conventional radio receiver in that it further includes an additional radio receiver module 310 in order to remove an audible noise signal, such as a whistle tone, from the audio signal. In this example, the additional radio frequency module 310 is provided subsequent to the mixer 308 in the receiver chain of the radio receiver 300.

Figure 4:
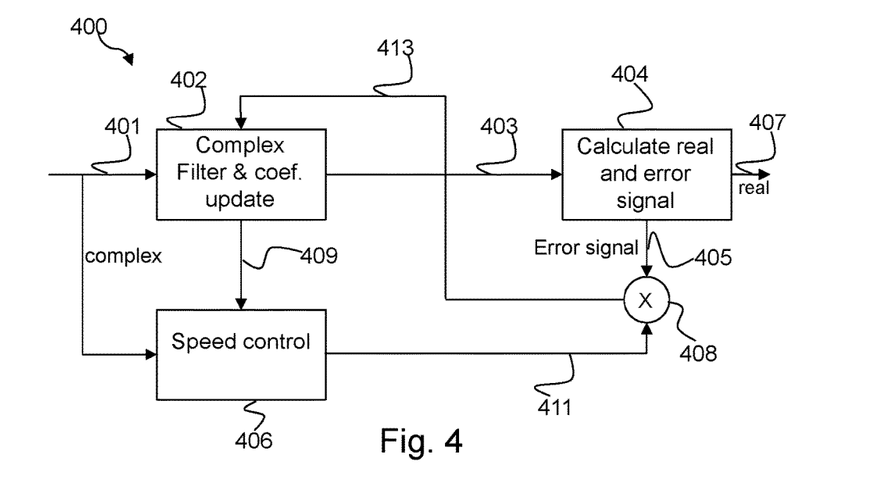
FIG. 4 shows a schematic block diagram of a radio receiver module for compensating for a noise signal.

FIG. 4 illustrates a schematic block diagram of a module 400 for compensating for a noise signal present in an upper sideband or lower sideband of an AM signal. The correction module 400 comprises an adaptive filter 402, error signal generator 404 and an update speed controller 406. An objective of the correction module 400 is to assure a flat audio response while removing whistle noise from the signal.

The correction module is suitable for placing in an AM synchronous demodulator after the carrier has been down converted to 0 Hz and oriented in the real domain, and may be applied before any non-linear processing of the signal.

The adaptive filter may be implemented as a finite response filter (FIR) with filter coefficients that define a number of taps. The adaptive filter 402 may use a least mean squared (LMS) based update algorithm, for example. The adaptive fitter 402 may have any arbitrary filter length, which may have an odd number of taps. To be able to create a deep notch at low frequencies a long filter may be needed. A long filter may have more than 10 taps, and preferably more than 50 taps. In one example, the filter may have 81 taps. The adaptive filter 402 is configured to receive an input signal 401 that can be represented by complex frequencies, in which a desired signal, such as an audio signal, is present within the real frequency domain. A noise signal that is interfering with the audio signal may be a complex frequency signal having both non-zero real and non-zero imaginary components.

The correction module 400 has a response comparable to a band selective Hilbert transform. A Hilbert transform selects a single side band, the 'normal' Hilbert transform selects either all positive or all negative frequencies. The Hilbert transform has an impulse response that is antisymmetric where the real centre coefficient is 1 and the other real coefficients are '0'. The imaginary coefficients are antisymmetric. The correction module 400 does not necessarily include any code to assure this, however for whistle conditions this condition is met.

Implementations of the adaptive filter 402 may also have a calculated frequency response with properties of the Hilbert transform. The adaptive filter 402 has a flat response for the audio that is transmitted at both sides while the frequency at which the noise occurs in the real and imaginary domains is suppressed. The adaptive filter 402 may automatically suppress frequencies where needed while keeping a nearly ideal response for other audible frequencies.

In this way, the adaptive filter 402 attenuates the noise signal at the noise frequency and increase a gain at a mirror frequency to provide a filtered signal 403. The mirror frequency is within the sideband that is unaffected by the unwanted noise signal and the mirror frequency corresponds to the noise frequency. The mirror frequency corresponds to the noise frequency in that the mirror frequency has a bandwidth that is separated from a carrier frequency of the signal by a corresponding, or the same, frequency that the noise signal is separated from the carrier frequency. The increase in gain at the mirror frequency may be a relative increase in gain with respect to the gain at a different frequency within the sideband containing the mirror frequency. The gain at the mirror frequency may be doubled with respect to the gain at the different frequency within the sideband containing the mirror frequency in order to compensate for the removed energy of the wanted signal that is attenuated at the noise frequency.

The coefficients of the adaptive filter may be periodically or repeatedly updated in order to allow the system to adapt to changes in the frequency of the noise signal. Amplitude changes of the whistle do not require the filter coefficients to be updated. Only the imaginary filter coefficients of the adaptive filter 402 are updated or adapted. That is, the real coefficients of the adaptive filter are constant, and not updated. When the distortion in the signal is multiplied by the imaginary coefficients, the result is a signal in the real domain that compensates for the real noise signal (as $|*|=-1$).

The error signal generator 404 is configured to receive the filtered signal 403 from the adaptive filter 402 and to provide an error signal 405 based on the filtered signal 403. The error signal 405 relates to the presence of the noise signal. The error signal generator 404 therefore provide a noise detector that is configured to identify an unwanted noise signal associated with a noise frequency within the lower or upper side band. The adaptive filter 402 is configured to recalculate the filter coefficients based on the error signal. A constant phase optimization algorithm may be used to determine the error signal. In such examples, the error=x−abs(x), where x relates to the filtered output.

The error signal generator 404 in this example also calculates an output signal 407 to be provided as an output based on the filtered signal 403. The output signal 407 relates to the real part of the filtered signal 403.

Example Matlab™ code for implementing the correction module 400 is provided below. The variables in the code below are summarised in the following table.

| Variable | Description |
| --- | --- |
| FilterCoefsQ | An array of the quantized filter coefficients. The use of quantized filter coefficients allows for lower precision multiplication. |
| FilterCoefs | An array of the filter coefficients of the filter |
| NrOfBitsCoefs | An integer value of the number of bits in each coefficient |
| ReceivedSignal | The received signal as a function of count (proportional to time) |
| FilteredInputInt | The filtered input signal as a function of count |

The processing loop for the whistle correction module is:
```
% rounding for output calculation may be performed to
    reduce processing load
FilterCoefsQ
=1*round(real((FilterCoefs)*2^(NrOfBitsCoefs)))/2^
    (NrOfBitsCoefs);
FilterCoefsQ
=FilterCoefsQ+1i*round(imag(FilterCoefs)*2^(NrOf-
    BitsCoefs))/2^(NrOfBitsCoefs);
FilteredInputInt(count)=ReceivedSignal(count−ChanEQ-
    Length+1:count)*FilterCoefsQ'+
    Fact1*ReceivedSignal(count);
% error calculation
error(count)=FilteredInput(count)−abs(FilteredInput
    (count));
% required processing 1*Length*(Load+MAC) (Error is
    imag only & Only Imag Coefficients needed.)
CoefUpdate=mu*error(count)*ReceivedSignal(count−
    ChanEQLength+1:count);
FilterCoefs=round((FilterCoefs−1i*imag(CoefUpdate)))/
    2^(NrOfBitsAverage);% conj(CoefUpdate);
% Leakage only every 512 samples, in this example,
    multiplication per imag coefficient
% thus length
if mod(count,512)==1
    FilterCoefs=real(FilterCoefs)+1i*0.999*round(imag(Fil-
        terCoefs)*2^(NrOfBitsAvg))/2^(NrOfBitsAvg);
    % conj(CoefUpdate);
end
```

The steps of calculating the filter output and the error are similar to those for an adaptive filter used in a conventional channel equalizer. The filter updating (the recalculation of FilterCoefs based on CoefUpdate in the code above differs from a conventional adaptive filter in which:

```
FilterCoefs=FilterCoefs+mu*error(count)*ReceivedSig-
    nal(count−ChanEQLength+1: count);
```

By forcing the real part to '0' except the centre frequency (which occurs at initialization and is unchanged on updating), and generating the required response by the imaginary coefficients only, the required flat audio response may be achieved. Allowing any coefficient update in the real part would lead to a non-flat audio response, and so by avoiding such filtering the method prevents audible distortion. In general, an adaptive filter tends to remove the audio content when its real coefficients are active (non-zero).

For the output and error calculation the required processing is 2*FilterLength MAC operation. A MAC operation is a multiply accumulate operation. Digital signal processors may have a dedicated processing unit that can add the output of a multiplication to a value stored in its local register in one processing timeslot/cycle in order to perform a MAC operation. For the coefficient update, another FilterLength multiplications is required. The adaptive filter algorithm does not necessarily perform normalization, which may instead be performed by an audio automatic gain control earlier in the receiver chain, as discussed above with reference to FIG. 2.

It has been found that implementations of the correction module 400 in which the error signal is determined by the error signal generator 404 based on the absolute value of the filtered signal (as in the example code above) may suffer from lock issues (where the filter coefficients do not converge on a stable value) for single tone audio in combination with a single whistle tone when the sum of the tones amplitude exceeds the amplitude of the carrier frequency. When the sum of the modulations exceeds the carrier amplitude, the absolute function will change the sign of the real part. Therefore, when the phase of the tone is such that it is in the imaginary plane the amplitude of the absolute is larger than the amplitude of the real part. When this occurs the real part of the error signal is no longer reliable. In such cases, it has been found that by modifying the type of error signal that is determined by the error signal generator 404, the convergence performance of the correction module 400 may be improved.

```
error(count)=FilteredInput(count)−abs(FilteredInput
    (count));
```
to
```
error(count)=imag(FilteredInput(count));
```

Error calculation based on the imaginary filtered components also has the advantage of requiring less processing power than the alternative presented above. It has been found in simulations that using this improved error calculation enables the correction module 400 to operate correctly where a combination of a whistle and audio exceeds the carrier amplitude.

Lock detection, in which the system determines that the frequency of the noise has moved such that the lock of the filter on the noise is lost and the set of filter coefficient values is no longer suitable for cancelling the noise signal, may optionally also be provided.

One important feature of the correction module 400 is the flexibility in coefficient updating that is afforded compared to the use of a conventional adaptive filter. The updating of the filter coefficients is controlled, in this example, by an update speed controller 406 which receives the complex input signal 401 and internal signals 409 from the adaptive filter 402 and provides a control signal 411 to a multiplication unit 408. The multiplication unit 408 multiplies the control signal 411 and the error signal 405 and provides the multiplied signal as a modified error signal 413 as an input to the adaptive filter 402.

The update speed may be controlled by applying an update speed factor (speedFact) when calculating the coefficient update (CoefUpdate), as shown in the modified code below.

CoefUpdate=speedFact*mu*error(count)*ReceivedSignal(count−ChanEQLength+1:count);

The update speed controller 406 may be configured to enable the filter coefficients to be updated (by setting the control signal 411 to a value between 0 and 1, for example) in accordance with a determination of a change in the noise signal and based on an amplitude of real frequency components of the signal or filtered signal.

The updating may occur at a variable rate and so offer improved performance in the case where the amplitudes of the audio content and the noise signal are both strong, or when the noise signal is relatively constant as a function of time. Alternatively, the update speed controller 406 may be configured to enable the filter coefficients to be updated at a fixed interval (in which case the update speed controller 406 may not require any further inputs, such as the complex input signal 401 and internal signals 409).

The dynamical control of the adaptation speed of an adaptive filter is discussed further below with regard to FIGS. 5 and 6. These examples extract and use information regarding the lock status of the adaptive filter (the extent to which the filter coefficients address the noise signal) and on how reliable the correction module can adjust its filter coefficients given the prevailing signal conditions. The examples described with reference to FIGS. 5 and 6 may be applied to adaptive filtering systems in general and the contribution of these examples is not necessarily solely restricted to use in combination with the correction method and module described previously with reference to FIGS. 2 to 4. Instead, the examples described with reference to FIGS. 5 and 6 may be used for any algorithm where correlation between the real and the imaginary part is needed to come to a correct solution because, independent of the filtering algorithm, the update should be frozen when the correlation can no longer be guaranteed.

Complications are encountered for some particular noise/signal amplitude conditions. For example, the combination of leakage while keeping the update speed high when possible can also assure better tracking. It will, however, lead to a less optimal solution for a stable distortion as more leakage is required. By leakage, it is meant that the calculated filter coefficients are slowly reduced to '0'. This can be done, for example, by multiplying all filter coefficients by 0.9. If the factor is too slow, the leakage is too fast, so a value closer to '1' is used.

When there is a strong wanted component at a frequency where the notch of the adaptive filter is located, an algorithm that uses a correlation between the real and imaginary part of the signal no longer has a reliable steering force. For example, the correction module described with reference to FIG. 4, may even converge to a flat filter response (in which no filtering is performed) in such conditions, thus losing the benefit of the adaptive filter.

Figure 5:
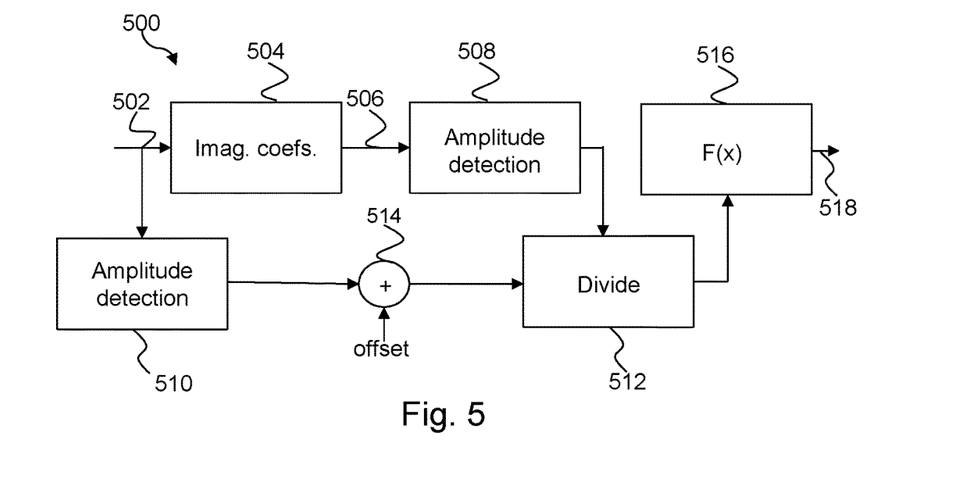
FIG. 5 shows a schematic block diagram of a lock detecting unit for implementing a update speed controller.
Figure 6:
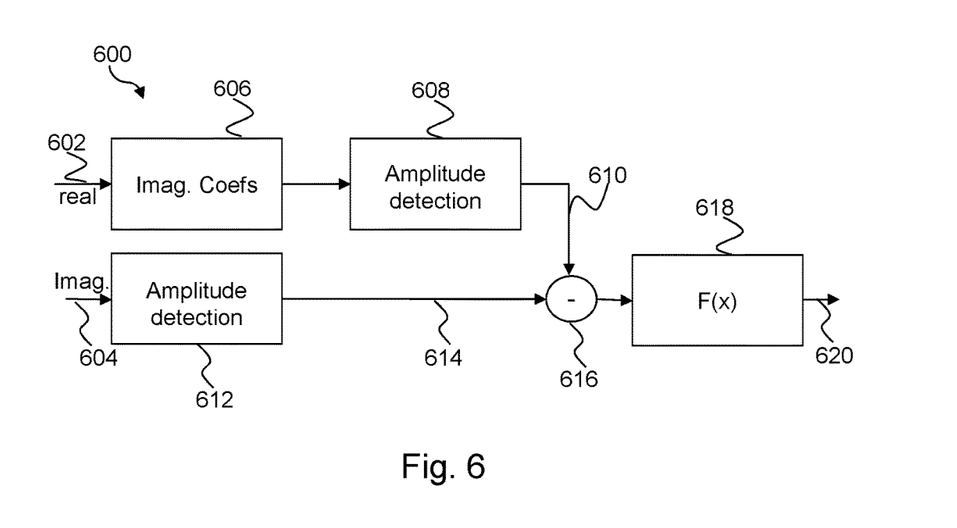
FIG. 6 shows a schematic block diagram of a strong audio detector for implementing an update speed controller.

FIGS. 5 and 6 relate to systems to allow the update speed of an adaptive filter to be varied, and in particular so that the update speed is reduced when the adaptive filter is currently locked onto a noise signal and the prevailing signal amplitude conditions are such that updating the adaptive filter would cause a worse match. The basis for 'in lock' detection is that the system needs to remove a certain part of the spectrum for which a good reference signal is available. For example for a notch adaptive filter, the inverse of the notch should pass the full spectrum of the reference signal. If the spectrum is passed by such a filter then the notch is at the correct location.

FIG. 5 illustrates a schematic block diagram for a lock detection unit 500 for a channel equalizer system. Lock detection unit 500 is configured to receive the imaginary part 502 of an output of an adaptive filter, such as that described previously with reference to FIG. 4. The lock detection unit 500 ensures that, once the whistle frequency changes, an 'out of lock' condition is generated indicating that an increase in filter coefficient update speed is needed.

In a first signal path, a band pass filter 504 receives the imaginary part 502 and provides a bandpass filtered signal 506 to a first path amplitude detector 508. The band pass filter takes the imaginary coefficients of the notches of the adaptive filter in order to define its passband.

In a second signal path, a second path amplitude detector 510 receives the imaginary part 502.

The first and second path amplitude detectors 508, 510 provide respective amplitudes to a divider 512. The divide function ensures that the output only indicates how well the adaptive filter selects the band of interest. In this way, the lock indication response generated by the lock detection unit 500 is independent of the amplitude of the whistle. White noise in the RF spectrum will also result in content in the imaginary part and so it may, in some examples, not be appropriate to determine the lock condition based on an exact correspondence between the output of the bandpass filter 504 and the imaginary part 502 of an output of an adaptive filter because the white noise could lead to an erroneous 'out of lock' indication. The adaptive filter may therefore be considered to be 'in lock' when the output of the bandpass filter 504 contains approximately the same amount of energy as the imaginary part 502 of an output of an adaptive filter. That is, when the output of the bandpass filter 504 is within a threshold of the imaginary part 502 of an output of an adaptive filter.

Note that in case no whistle is present, the adaptive filter converges to all '0' for the imaginary coefficients. In such a condition, an ideal signal-to-noise ratio may be achieved for an undistorted input signal.

An adder unit 514 applies an offset to the output of the second path amplitude detector 510 before the divider 512. The offset input allows for subtracting white noise that is present in the input signal 502. The offset may, for example, be based on the amplitude of the carrier of the RF input signal.

A function 516 is applied to the output of the divider 512 in order to provide a lock status indicator 518, which may have a value between 0 and 1. An arbitrary function can be used here. The function 'CoefFactor=1−RangeSelect(x)*0.999' has been used in some simulations. The translation of the output of the divider 512 to a change in the adaptation speed can be arbitrarily selected. A sliding scale may therefore be used to indicate how close to a lock condition the system is. In the case where the noise level is larger than the offset, the system may still indicate nearly in lock.

The update speed controller of the correction module of FIG. 4 may set the update speed in accordance with the lock status indicator 512.

FIG. 6 illustrates a strong audio detector 600 for providing a strong audio status indicative of how reliably information in the real input values that are used in the calculation of coefficient updatescan be used to detect the location of the distortion. If strong audio is present that could prevent a successful update of the filter coefficients then the strong audio detector 600 will prevent coefficient updating, or reduce the update speed. For the correction module described with reference to FIG. 4, the phase of the real part is compared to the phase of the imaginary part (implicitly by the coefficient update in combination with error detection) it is needed to know if the noise signal is in the upper or lower sideband. For other systems that rely on correlation it is also required to stop updating when the uncorrelated signal is stronger than the correlated signal in a specific area.

The system is constructed such that when there is no or low modulation content, the update speed of the adaptive filter is relatively frequent. Rapid updating helps the system to keep lock under changing conditions and also updates to the improved or optimised condition as fast as possible when the information is most reliable. The goal of the strong audio detector 600 is to prevent an optimized condition being lost as a result of audio components occurring at that same frequency as the noise frequency. The update speed of the adaptive can also be set fast when only content outside the spectrum that is to be correlated is present (that is, when there is no audio on the desired channel).

The strong audio detector 600 comprises a real signal path and an imaginary signal path. The real signal path comprises a band pass filter 606 that receives the real part of the output of the adapter filter. The bandpass filter 606 is configured to only pass real frequencies outside of the sideband of interest. A real amplitude detector 608 receives the output of the band pass filter 606 and provides a real amplitude 610.

The imaginary signal path comprises an imaginary amplitude detector 612 and provides an imaginary amplitude 614 to a subtractor 616. The subtractor 616 subtracts the imaginary amplitude 614 from the real amplitude 610.

A function 618 is applied to the output of the subtractor 616 in order to provide an audio status indicator 620, which may have a value between 0 and 1. An arbitrary function can be used here. The function 'CoefFactor=1−RangeSelect(x)*0.999' has been used in some simulations. A function with a smoother transition between 0 and 1 can be selected to improve the system behaviour.

The update speed controller of the correction module of FIG. 4 may set the update speed in accordance with the audio status indicator 620.

The strong audio detector 600 was tested in a simulation with the correction module described previously with reference to FIG. 4 for example signal conditions in which a whistle tone changed frequencies as a function of time. At moments when the audio was strong, the audibility of the whistle did increase when the tone moved outside the notch of the filter. The system speeding up as a result of lock loss took care of still enforcing sufficient update speed to track the whistle tone. When the audio was strong, the tone was masked by the audio and thus was not as disturbing for the listener. It therefore matters less if the there is a lag in the filter tracking the tone when a loud audio signal is present. When the audio is muted the suppression is improved by the strong audio detector 600 automatically increasing the update speed. Another simulation, in which a constant noise tone was applied, the noise tone disappeared when the audio was muted and did not return when the audio reappeared. The adaptation rate was set 1000 times slower when strong audio was detected in these examples. With this example it is proven that the proposed system of adapting adaptation speed does significantly improve the system performance.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A radio receiver module for receiving a signal having a lower side band and an upper side band, the radio receiver module comprising:
   a noise detector configured to identify a noise frequency associated with an unwanted noise signal within the lower or upper side band;
   a filter configured to attenuate the noise frequency and increase gain at a mirror frequency within the signal in order to provide a filtered signal, wherein the mirror frequency is within the sideband that is unaffected by the unwanted noise signal and the mirror frequency corresponds to the noise frequency.

2. The radio receiver module of claim 1, wherein the mirror frequency has a frequency range that is less than a bandwidth of the sideband in which it is situated.

3. The radio receiver module of claim 1, wherein the filter is an adaptive filter having filter coefficients.

4. The radio receiver module of claim 3, wherein the noise detector is configured to receive the filtered signal from the adaptive filter and provide an error signal based on the filtered signal, wherein the adaptive filter is configured to recalculate the filter coefficients based on to the error signal.

5. The radio receiver module of claim 4, wherein the adaptive filter is configured to update only imaginary adaptive filter coefficients based on the error signal.

6. The radio receiver module of claim 4, wherein the error signal is based on an imaginary signal component of the filtered signal.

7. The radio receiver module of claim 3, comprising an update controller configured to control updating of the filter coefficients in response to one or more of:
   an amplitude of real frequency components of the signal;
   an amplitude of real frequency components of the filtered signal;
   an amplitude of imaginary frequency components of the filtered signal;
   the change in the noise signal; and
   the presence of an audio signal in the upper or lower side bands in comparison with an audio threshold.

8. The radio receiver module of claim 7, wherein the update controller configured to:
   determine a change in the noise frequency associated with the unwanted noise signal; and
   instruct the adaptive filter to update the filter coefficients in response to the determination of the change in the noise signal.

9. The radio receiver module of claim 7, wherein the update controller comprises a band pass filter configured to pass a signal at the one or more filter coefficients of the adaptive filter, wherein the bandpass filter is arranged to receive an output of the adaptive filter and provide a band-passed signal, and wherein the update controller is configured to update the adaptive filter in accordance with a comparison between the output of the adaptive filter and the band-passed signal.

10. The radio receiver module of claim 9:
    wherein the band pass filter is configured to pass a signal at the one or more imaginary domain filter coefficients of the adaptive filter; and
    wherein the update controller is configured to update the adaptive filter in accordance with the imaginary part of the output of the adaptive filter and the band passed signal.

11. The radio receiver module of claim 1, wherein the increase in gain at the mirror frequency is a relative increase with respect to a frequency within the sideband that is unaffected by the unwanted noise signal other than the mirror frequency.

12. The radio receiver module of claim 1, wherein the mirror frequency corresponds to the noise frequency in that the mirror frequency has a bandwidth that is separated from a carrier frequency of the signal by a corresponding frequency that the noise signal is separated from the carrier frequency.

13. A vehicle comprising a radio receiver having the radio receiver module of claim 1.

14. A method of receiving a signal having a lower side band and an upper side band, the method comprising:
    identifying a noise frequency associated with an unwanted noise signal within either the lower or upper side band;
    attenuating the noise frequency; and
    increase a mirror frequency within the signal, wherein the mirror frequency is within the sideband that is unaffected by the unwanted noise signal and the mirror frequency corresponds to the noise frequency.

15. A non transitory computer readable media including a computer program configured to cause a computer to implement the method of claim 14.

* * * * *